Patented Oct. 28, 1924.

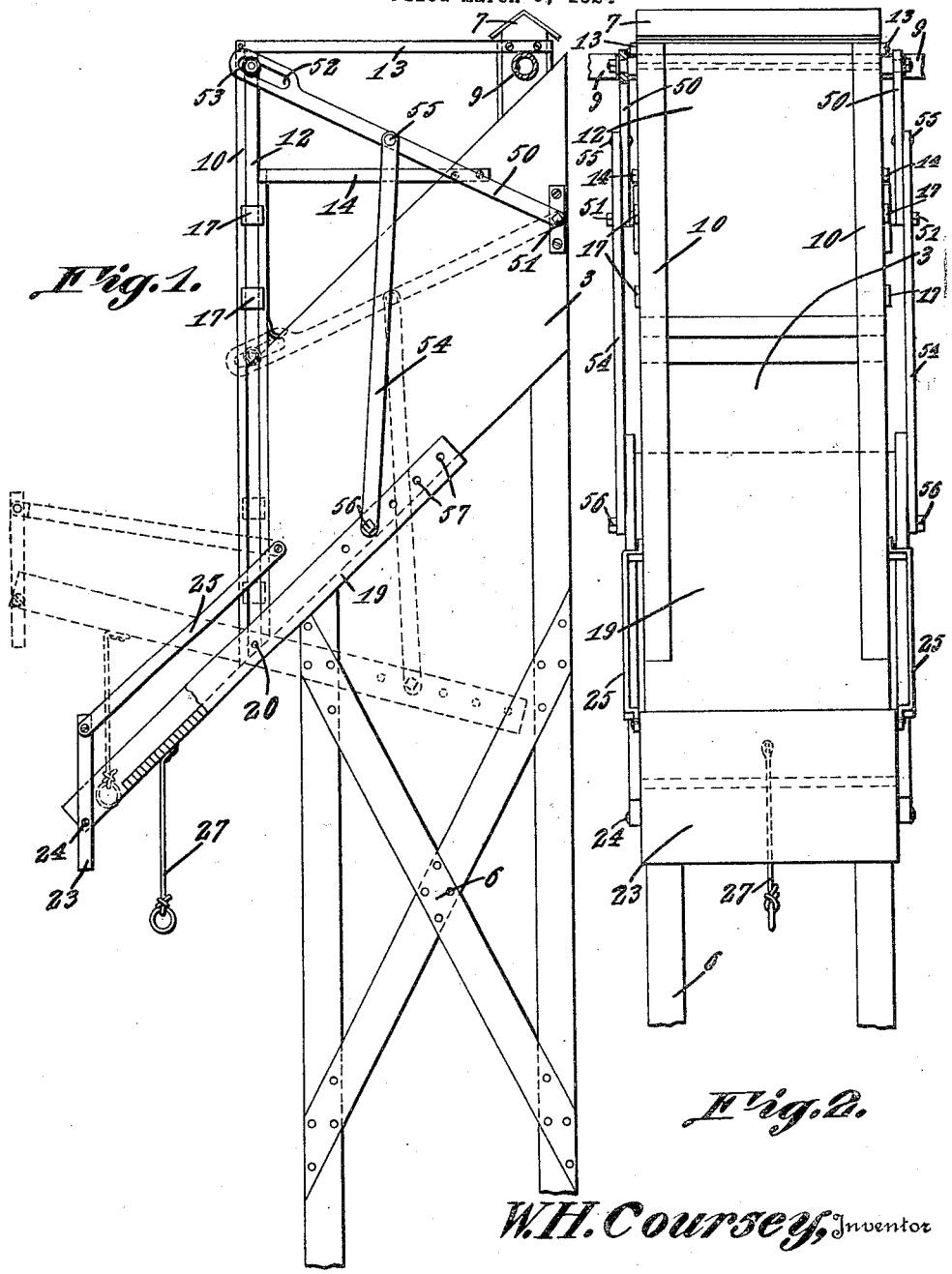

1,513,034

UNITED STATES PATENT OFFICE.

WILLIAM H. COURSEY, OF BROWNSBORO, TEXAS.

SEED HOPPER.

Application filed March 8, 1924. Serial No. 697,823.

*To all whom it may concern:*

Be it known that I, WILLIAM H. COURSEY, a citizen of the United States, residing at Brownsboro, in the county of Henderson and State of Texas, have invented a new and useful Seed Hopper, of which the following is a specification.

The device forming the subject matter of this application is a seed hopper of that general type shown in my Patent No. 1,111,057, granted on September 22, 1914.

The device shown in the aforesaid patent, and the device shown in this application each comprise a vertically moving door. It has been alleged by some that the door in my patented device, aforesaid, works with too much friction, and, with a view to improving the device in this particular, the invention aims to provide novel means for operating the door with less friction.

It is within the province of the disclosure to improve generally and to enhance the utility of devices of that sort to which the invention appertains.

With the above and other objects in view, which will appear as the description proceeds, the invention resides in the combination and arrangement of parts and in the details of construction hereinafter described and claimed, it being understood that changes in the precise embodiment of the invention shown, can be made, without departing from the spirit of the invention.

In the drawings:—

Figure 1 shows in side elevation, a device constructed in accordance with the invention and Figure 2 is a front elevation.

The device forming the subject matter of this application comprises many parts which are old and some parts which are new. Those parts of the structure which is shown in my prior Patent No. 1,111,057 will be described first and notice will be given when the description refers to parts which are new.

A bin 3, having a downwardly inclined bottom, is supported on a frame 6. The upper end of the bin 3 carries a casing 7 with which pipes 9 communicate. The seed passes into the casing 7 through the pipes 9 and drops into the bin 3. Guides 10 are mounted on the forward end of the bin 3 at the sides thereof. The guides 10 are sustained by a brace 14 connected to the bin 3 and by a brace 13 connected to the casing 7. The flow of the seed out of the bin 3 is controlled by a vertically movable door 12 mounted to slide in the guides 10, the door having projections 17 which engage the outer lateral edges of the guides and aid in directing the movement of the door. A chute 19 is pivotally mounted intermediate its ends, as at 20, on the lower ends of the guides 10. The rear end of the chute 19 extends backwardly below the bin 3, and the forward end of the chute projects outwardly with respect to the bin. There is a handle 27 on the forward end of the chute 19, whereby the forward end of the chute may be moved downwardly from the dotted line position of Figure 1 to the solid line position of that figure. A baffle 23 is pivotally mounted intermediate its ends, as at 24 on the forward end of the chute 19 and directs the seed downwardly, as the seed flows out of the chute. The rear ends of links 25 are pivoted to the sides of the bin 3, and the forward ends of the links are pivoted to the upper portion of the baffle 23. If some suitable connection between the chute 19 and the door 12 is provided, the chute will be swung upwardly at its outer end, from the solid line position in Figure 1 to the dotted line position of that figure by the weight of the door 12, when the door moves downwardly to a closed position, and when the outer end of the chute is pulled downwardly by the handle 27, the door 12 will move upwardly and open the outlet end of the bin 3, whereby the bin will be permitted to discharge into the chute 19.

The structure above described, is shown in my prior patent hereinbefore mentioned.

Passing to parts which are new, it may be stated that the rear ends of radius arms 50 are pivotally mounted at 51 on the sides of the bin 3, near to the rear end of the bin. Guide slots 52 are fashioned in the forward ends of the radius arms 50 and receive rollers 53, or other antifriction devices, mounted on the edges of the door 12. Substantially vertical links 54 are supplied, the upper ends of the links being pivoted at 55 to the radius arms 50 intermediate the ends of the radius arms. The lower ends of the links 54 are connected by pivot elements 56 with the rear end of the chute 19. In order to effect an adjustable pivotal connection between the lower ends of the links 54 and the chute 19, the chute is provided in its sides and at its rear end with openings 57, adapted to receive the pivot elements 56.

The improved connection between the chute 19 and the door 12 reduces the friction caused by the sliding of the door 12, and accomplishes the object set forth in the opening portion of this specification.

I claim—

In a device of the class described, a frame, a bin on the frame, and having a downwardly inclined bottom, a chute pivotally supported intermediate its ends, the chute extending backwardly beneath the bin and forwardly with respect to the bin, a door slidably mounted at the mouth of the bin, a radius arm pivotally mounted at its rear end, a slidable anti-friction connection between the forward end of the radius arm and the door, a link pivotally mounted at its upper end on the radius arm, intermediate the ends of the radius arm, and means for connecting the lower end of the link with the rear portion of the chute at adjusted points spaced longitudinally of the chute.

In testimony that I claim the foregoing as my own, I have hereto affixed my signature in the presence of two witnesses.

WILLIAM H. COURSEY.

Witnesses:
W. G. FOWLER,
I. T. FULGHAM.